United States Patent
Huang et al.

(10) Patent No.: US 11,513,397 B2
(45) Date of Patent: Nov. 29, 2022

(54) MANUFACTURING METHOD OF LIQUID CRYSTAL DISPLAY PANEL AND LIQUID CRYSTAL DISPLAY PANEL

(71) Applicant: Shenzhen China Star Optoelectronics Semiconductor Display Technology Co., Ltd., Guangdong (CN)

(72) Inventors: Min Huang, Guangdong (CN); Jianhong Chen, Guangdong (CN)

(73) Assignee: Shenzhen China Stor Optoelectronics Semiconductor Display Technology Co., Ltd., Shenzhen (CN)

( * ) Notice: Subject to any disclaimer, the term of this patent is extended or adjusted under 35 U.S.C. 154(b) by 172 days.

(21) Appl. No.: 17/055,620

(22) PCT Filed: Aug. 11, 2020

(86) PCT No.: PCT/CN2020/108315
§ 371 (c)(1),
(2) Date: Nov. 16, 2020

(87) PCT Pub. No.: WO2022/011763
PCT Pub. Date: Jan. 20, 2022

(65) Prior Publication Data
US 2022/0187661 A1    Jun. 16, 2022

(30) Foreign Application Priority Data

Jul. 13, 2020  (CN) .......................... 202010667586.2

(51) Int. Cl.
*G02F 1/1337*      (2006.01)

(52) U.S. Cl.
CPC .. *G02F 1/133788* (2013.01); *G02F 1/133761* (2021.01)

(58) Field of Classification Search
CPC ........... G02F 1/13378; G02F 1/133788; G02F 1/133773
(Continued)

(56) References Cited

U.S. PATENT DOCUMENTS

| 5,818,560 A | 10/1998 | Kouno et al. |
| 2001/0000438 A1* | 4/2001 | Kim ................ G02F 1/133753 349/126 |

(Continued)

FOREIGN PATENT DOCUMENTS

| CN | 1155093 | 7/1997 |
| CN | 101387781 | 3/2009 |

(Continued)

*Primary Examiner* — Dung T Nguyen
*Assistant Examiner* — David Y Chung (57) ABSTRACT

A manufacturing method of a liquid crystal display panel includes vertically irradiating a first substrate and a second substrate with ultraviolet light for alignment. An energy compensation device is formed and/or placed in an irradiation direction of the ultraviolet light. An angle difference of pretilt angles between liquid crystal molecules inside the first substrate and liquid crystal molecules inside the second substrate is greater than a preset angle. An energy intensity inside the first substrate or inside the second substrate is controlled by the energy compensation device, so that pretilt angle difference between the liquid crystal molecules inside the first substrate and the liquid crystal molecules inside the second substrate is large.

14 Claims, 6 Drawing Sheets

(58) Field of Classification Search
USPC .................................................. 349/124, 128
See application file for complete search history.

(56) References Cited

U.S. PATENT DOCUMENTS

| | | | |
|---|---|---|---|
| 2006/0061715 A1 | 3/2006 | Tashiro et al. | |
| 2014/0098313 A1* | 4/2014 | Jang | G02F 1/1337 438/30 |
| 2019/0056618 A1* | 2/2019 | Xu | G02F 1/133512 |

FOREIGN PATENT DOCUMENTS

| | | |
|---|---|---|
| CN | 102135684 | 7/2011 |
| CN | 103969882 | 8/2014 |
| CN | 105404060 | 3/2016 |
| CN | 105988248 | 10/2016 |
| CN | 106405944 | 2/2017 |
| CN | 206096709 | 4/2017 |
| EP | 0667554 | 8/1995 |
| JP | 06-337420 | 12/1994 |

\* cited by examiner

MANUFACTURING METHOD OF LIQUID CRYSTAL DISPLAY PANEL AND LIQUID CRYSTAL DISPLAY PANEL

RELATED APPLICATIONS

This application is a National Phase of PCT Patent Application No. PCT/CN2020/108315 having International filing date of Aug. 11, 2020, which claims the benefit of priority of Chinese Patent Application No. 202010667586.2 filed on Jul. 13, 2020. The contents of the above applications are all incorporated by reference as if fully set forth herein in their entirety.

FIELD AND BACKGROUND OF THE INVENTION

The present application relates to the field of liquid crystal display technologies, and more particularly to a manufacturing method of a liquid crystal display panel and a liquid crystal display panel.

In a light alignment process of a current curved liquid crystal display panel, ultraviolet light is incident from one side of a substrate, and a first substrate and a second substrate are irradiated by light for the same time and the same light intensity. This results in a small angle difference in pretilt angles between liquid crystal molecules inside the first substrate and liquid crystal molecules inside the second substrate. In the case of a curved surface, a substrate stress will cause uneven display of the liquid crystal display panel and deterioration of image quality.

Technical Problem:

The current liquid crystal display panel has a technical problem that the angle difference in the pretilt angles between an inner side of the first substrate and an inner side of the second substrate is small.

SUMMARY OF INVENTION

Embodiments of the present application provide a manufacturing method of a liquid crystal display panel and a liquid crystal display panel, which can alleviate a technical problem that a current liquid crystal display panel has a small angle difference in pretilt angles between an inner side of a first substrate and an inner side of a second substrate.

An embodiment of the present application provides a manufacturing method of a liquid crystal display panel comprising providing a first base and a second base; forming a first alignment layer on the first base to form a first substrate; forming a second alignment layer on the second base to form a second substrate; arranging the first substrate and the second substrate in a cell to form a liquid crystal cell, and injecting liquid crystal molecules into the liquid crystal cell; irradiating the first substrate and/or the second substrate vertically with ultraviolet light; and forming and/or placing at least one energy compensation device in an irradiation direction of the ultraviolet light to make an angle difference between pretilt angles between first liquid crystal molecules inside the first substrate and second liquid crystal molecules inside the second substrate is greater than a preset angle.

The manufacturing method of the liquid crystal display panel according to an embodiment of the present application, in a step of forming and/or placing the at least one energy compensation device: the first substrate is an array substrate, the energy compensation device comprises a metal layer with negative refraction characteristics, and the metal layer with negative refraction characteristics is formed by vapor deposition on an inner surface of the first base.

The manufacturing method of the liquid crystal display panel according to an embodiment of the present application, in a step of forming and/or placing the at least one energy compensation device: the first substrate is an array substrate, the ultraviolet light is irradiated to the first substrate from an outside of the second substrate, the energy compensation device comprises a reflective component, the reflective component is placed outside the first base, and the reflective component is configured to reflect light to an inner area of the first substrate.

The manufacturing method of the liquid crystal display panel according to an embodiment of the present application, in a step of placing the reflective component: the reflective component comprises a reflective layer and a first control system, the reflective layer is placed outside the first substrate on a path propagation of the ultraviolet light, the reflective layer is electrically connected to the first control system, and a reflection intensity of the reflective layer is controlled by the first control system.

The manufacturing method of the liquid crystal display panel according to an embodiment of the present application, wherein in a step of forming and/or placing the at least one energy compensation device: the first substrate is an array substrate, the ultraviolet light is irradiated to the first substrate from an outside of the second substrate, the energy compensation device comprises an optical component, the optical component is placed outside the first base, and the optical component is configured to control a propagation direction of the ultraviolet light and change the ultraviolet light in a parallel state to a divergent state.

The manufacturing method of the liquid crystal display panel according to an embodiment of the present application, in a step of placing the optical component: the optical component comprises an optical device group and a second control system, on a propagation path of the ultraviolet light, the optical device group is placed outside the first substrate, the optical device group is electrically connected to the second control system, and a light divergence angle of the optical device group is controlled by the second control system.

The manufacturing method of the liquid crystal display panel according to an embodiment of the present application, in a step of forming and/or placing the at least one energy compensation device: the second substrate is a color filter substrate, the energy compensation device comprises a metal layer with negative refraction characteristics, and the metal layer with negative refraction characteristics is formed by vapor deposition on an inner surface of the second base.

The manufacturing method of the liquid crystal display panel according to an embodiment of the present application, in a step of forming and/or placing the at least one energy compensation device: the second substrate is a color filter substrate, the ultraviolet light is irradiated to the second substrate from an outside of the first substrate, the energy compensation device comprises a reflective component, the reflective component is placed outside the second base, and the reflective component is configured to reflect light to an inner area of the second substrate.

The manufacturing method of the liquid crystal display panel according to an embodiment of the present application, in a step of placing the reflective component: the reflective component comprises a reflective layer and a first control system, the reflective layer is placed outside the second base on a path propagation of the ultraviolet light, the reflective layer is electrically connected to the first control system, and a reflection intensity of the reflective layer is controlled by the first control system.

The manufacturing method of the liquid crystal display panel according to an embodiment of the present application, in a step of forming and/or placing the at least one energy compensation device: the second substrate is a color filter substrate, the ultraviolet light is irradiated to the second substrate from an outside of the first substrate, the energy compensation device comprises an optical component, the optical component is placed outside the second base, and the optical component is configured to control a propagation direction of the ultraviolet light and change the ultraviolet light in a parallel state to a divergent state.

The manufacturing method of the liquid crystal display panel according to an embodiment of the present application, in a step of placing the optical component: the optical component comprises an optical device group and a second control system, on a propagation path of the ultraviolet light, the optical device group is placed outside the second substrate, the optical device group is electrically connected to the second control system, and a light divergence angle of the optical device group is controlled by the second control system.

The manufacturing method of the liquid crystal display panel according to an embodiment of the present application, in a step of forming and/or placing the at least one energy compensation device: the first substrate is an array substrate, the ultraviolet light is irradiated to the first substrate from an outside of the second substrate, the energy compensation device comprises a metal layer with negative refraction characteristics and a reflective component, the metal layer with negative refraction characteristics is formed on an inner surface of the first base, the reflective component is placed outside the first base, the reflective component comprises a reflective layer and a first control system, and a reflection intensity of the reflective layer is controlled by the first control system.

The manufacturing method of the liquid crystal display panel according to an embodiment of the present application, in a step of forming and/or placing the at least one energy compensation device: the first substrate is an array substrate, the ultraviolet light is irradiated to the second substrate from an outside of the first substrate, the energy compensation device comprises a metal layer with negative refraction characteristics and an optical component, the metal layer with negative refraction characteristics is formed on an inner surface of the first base, the optical component is placed outside the first base, the optical component comprises an optical device group and a second control system, and a light divergence angle of the optical device group is controlled by the second control system.

The manufacturing method of the liquid crystal display panel according to an embodiment of the present application, in a step of forming and/or placing the at least one energy compensation device: the second substrate is a color filter substrate, the ultraviolet light is irradiated to the second substrate from an outside of the first substrate, the energy compensation device comprises a metal layer with negative refraction characteristics and a reflective component, the metal layer with negative refraction characteristics is formed on an inner surface of the second base, the reflective component is placed outside the second base, the reflective component comprises a reflective layer and a first control system, and a reflection intensity of the reflective layer is controlled by the first control system.

The manufacturing method of the liquid crystal display panel according to an embodiment of the present application, in a step of forming and/or placing the at least one energy compensation device: the second substrate is a color filter substrate, the ultraviolet light is irradiated to the second substrate from an outside of the first substrate, the energy compensation device comprises a metal layer with negative refraction characteristics and an optical component, the metal layer with negative refraction characteristics is formed on an inner surface of the second base, the optical component is placed outside the second base, the optical component comprises an optical device group and a second control system, and a light divergence angle of the optical device group is controlled by the second control system.

An embodiment of the present application provides a liquid crystal display panel comprising a first substrate and a second substrate that are opposed to each other and arranged in a cell, and liquid crystal molecules arranged between the first substrate and the second substrate. The first substrate comprises a first base and a first alignment layer disposed inside the first base. The second substrate comprises a second base and a second alignment layer disposed inside the second base. A metal layer with negative refraction characteristics is provided on an inner surface of the first base or an inner surface of the second base, an angle difference between pretilt angles between first liquid crystal molecules inside the first substrate and second liquid crystal molecules inside the second substrate is greater than a preset angle.

The liquid crystal display panel according to an embodiment of the present application, the metal layer with negative refraction characteristics is disposed on an inner surface of the first base, and a pretilt deflection angle of the first liquid crystal molecules inside the first substrate is greater than a pretilt deflection angle of the second liquid crystal molecules inside the second substrate.

The liquid crystal display panel according to an embodiment of the present application, the metal layer with negative refraction characteristics is disposed on an inner surface of the first base, and a pretilt deflection angle of the first liquid crystal molecules inside the first substrate is less than a pretilt deflection angle of the second liquid crystal molecules inside the second substrate.

The liquid crystal display panel according to an embodiment of the present application, the metal layer with negative refraction characteristics is disposed on an inner surface of the second base, and a pretilt deflection angle of the first liquid crystal molecules inside the first substrate is greater than a pretilt deflection angle of the second liquid crystal molecules inside the second substrate.

The liquid crystal display panel according to an embodiment of the present application, the metal layer with negative refraction characteristics is disposed on an inner surface of the second base, and a pretilt deflection angle of the first liquid crystal molecules inside the first substrate is less than a pretilt deflection angle of the second liquid crystal molecules inside the second substrate.

Beneficial Effect:

A manufacturing method of a liquid crystal display panel provided by an embodiment of the present application includes vertical irradiation of a first substrate and a second substrate with ultraviolet light for alignment. An energy compensation device is formed and/or placed in an irradiation direction of the ultraviolet light. An angle difference in pretilt angles between first liquid crystal molecules inside the first substrate and second liquid crystal molecules inside the second substrate is greater than a preset angle. An energy intensity inside the first substrate or inside the second substrate is controlled by the energy compensation device, so that the angle difference in the pretilt angles between the first liquid crystal molecules inside the first substrate and the second liquid crystal molecules inside the second substrate is large. This alleviates a technical problem that a current liquid crystal display panel has a small angle difference in pretilt angles between an inner side of a first substrate and an inner side of a second substrate.

BRIEF DESCRIPTION OF THE SEVERAL VIEWS OF THE DRAWINGS

The following describes the specific implementations of the present application in detail with reference to the accompanying drawings, which will make the technical solutions and other beneficial effects of the present application obvious.

DESCRIPTION OF SPECIFIC EMBODIMENTS OF THE INVENTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in the present application, all other embodiments obtained by those skilled in the art without creative work are within the protection scope of the present application.

In the description of the present application, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or positional relationships are based on an orientation or positional relationship shown in the drawings. This is just to facilitate the description of the present application and simplify the description. This does not indicate or imply that the device or element referred to must have a specific orientation, be constructed and operated in a specific orientation. Therefore, it cannot be understood as a restriction on the present application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "multiple" means two or more than two, unless otherwise specifically defined.

Figure 1:
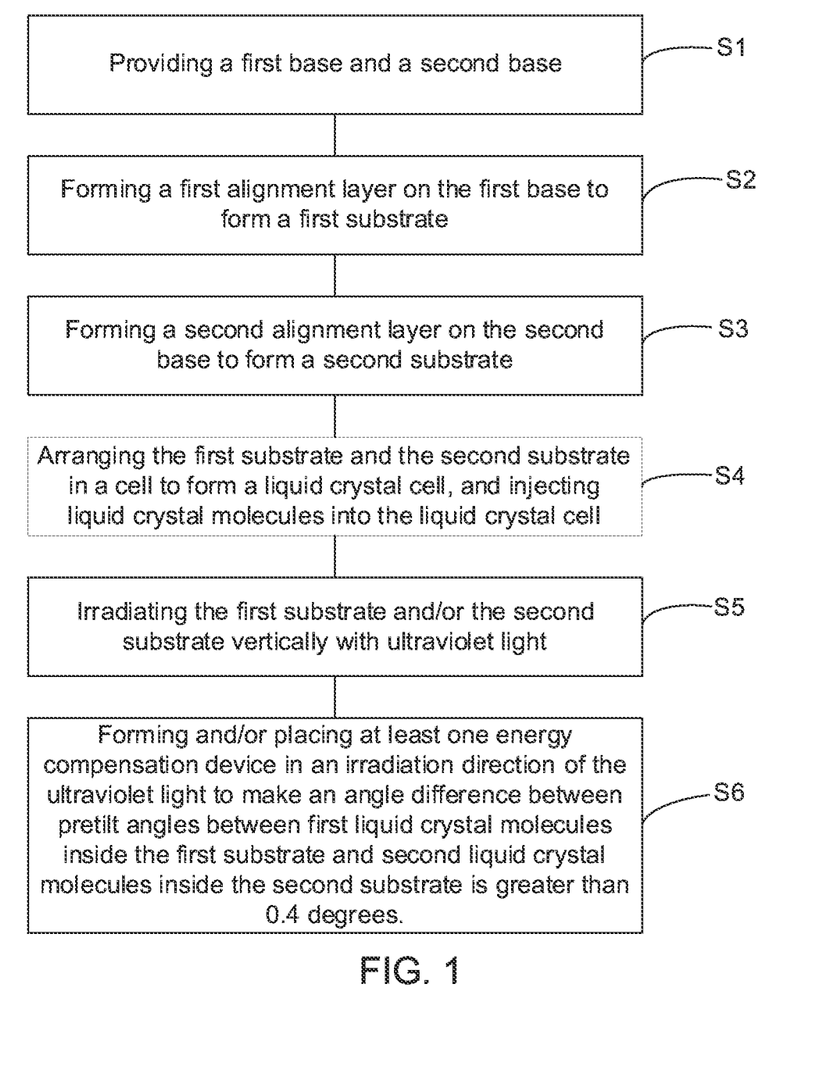
FIG. 1 is a schematic flowchart of a manufacturing method of a liquid crystal display panel provided by an embodiment of the present application.

Referring to FIG. 1, an embodiment of the present application provides a manufacturing method of a liquid crystal display panel comprising:

S1: providing a first base 101 and a second base 201.

S2: forming a first alignment layer 102 on the first base 101 to form a first substrate.

S3: forming a second alignment layer 202 on the second base 201 to form a second substrate.

S4: arranging the first substrate and the second substrate in a cell to form a liquid crystal cell, and injecting liquid crystal molecules into the liquid crystal cell.

S5: irradiating the first substrate and/or the second substrate vertically with ultraviolet light.

S6: forming and/or placing at least one energy compensation device in an irradiation direction of the ultraviolet light to make an angle difference between pretilt angles between first liquid crystal molecules 103 inside the first substrate and second liquid crystal molecules 203 inside the second substrate is greater than a preset angle.

In details, the energy compensation device includes at least one of a metal layer 303 having negative refraction characteristics, a reflective component 301, and an optical component 302.

In details, an inner side of the first substrate is a side of the first substrate facing the second substrate.

In details, an outer side of the first substrate is a side of the first substrate away from the second substrate.

In details, an inner side of the second substrate is a side of the second substrate facing the first substrate.

In details, an outer side of the second substrate is a side of the second substrate away from the first substrate.

In details, an energy sensing component is provided between the first alignment layer 102 and the second alignment layer 202, and the energy sensing component is electrically connected to the first alignment layer 102 and the second alignment layer 202. The energy sensing component is configured to sense an energy difference between the first alignment layer 102 and the second alignment layer 202.

In details, the energy sensing component may be a voltage measuring instrument.

In an embodiment of the present application, in a step of forming and/or placing the at least one energy compensation device: the first substrate is an array substrate, the energy compensation device comprises a metal layer 303 with negative refraction characteristics, and the metal layer 303 with negative refraction characteristics is formed by vapor deposition on an inner surface of the first base 101.

For the metal layer 303 with negative refraction characteristics, when ultraviolet light is irradiated to a surface of the metal layer with negative refraction characteristics, because an electronic vibration frequency and an ultraviolet light frequency reach resonance, an electromagnetic wave energy will be constrained in a surface area and be enhanced. Therefore, an energy of an inner surface of the first base 101 is increased, and the energy of the inner surface of the first base 101 is greater than an energy of an inner surface of the second base 201. Pretilt angles between the first liquid crystal molecules 103 inside the first substrate and the second liquid crystal molecules 203 inside the second substrate have a large angle difference.

Figure 2:
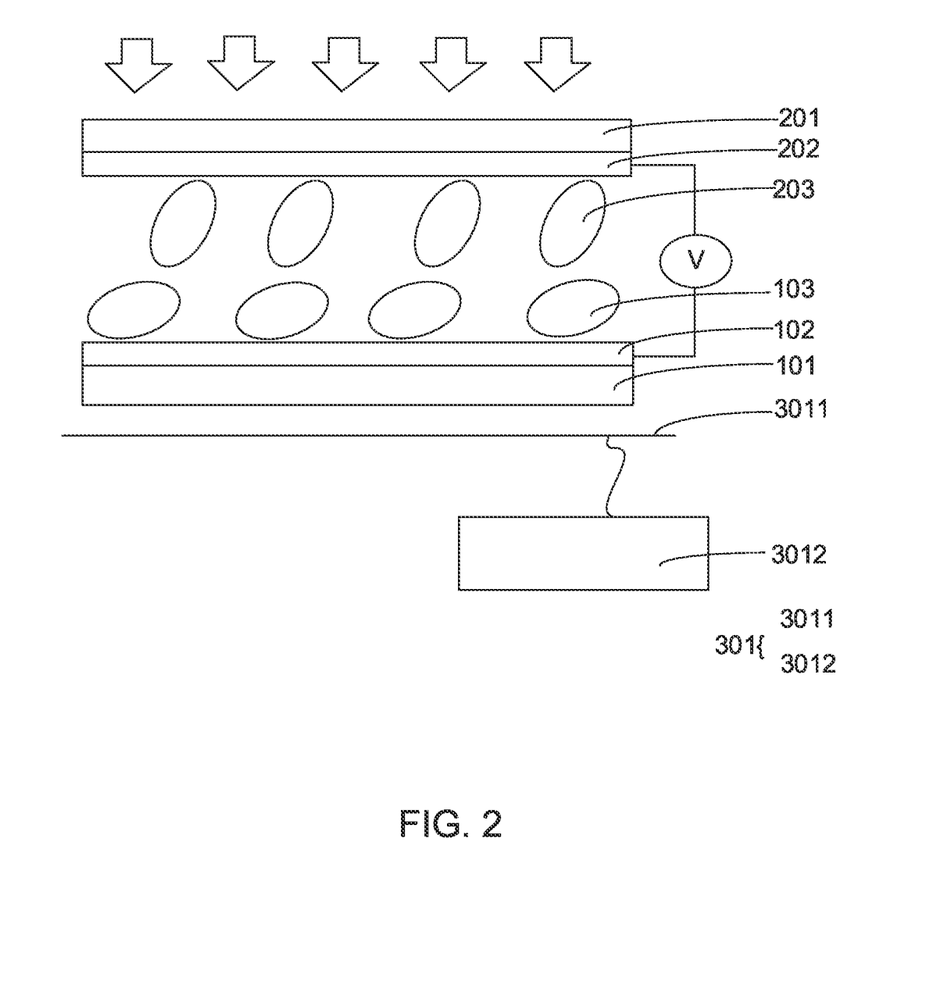
FIG. 2 is a first schematic cross-sectional view of alignment in a manufacturing method of a liquid crystal display panel provided by an embodiment of the present application.

In an embodiment of the present application, referring to FIG. 2, in a step of forming and/or placing the at least one energy compensation device: the first substrate is an array substrate, the ultraviolet light is irradiated to the first substrate from an outside of the second substrate, the energy compensation device comprises a reflective component 301, the reflective component 301 is placed outside the first base 101, and the reflective component 301 is configured to reflect light to an inner area of the first substrate.

In details, the reflective component 301 has a beam shaping function.

In details, the reflective component 301 first shapes the ultraviolet light in different directions into parallel light perpendicular to a glass surface. In this way, it can be ensured that the reflected ultraviolet light is evenly and smoothly irradiated to the glass surface, and uniformity of energy is improved.

In an embodiment of the present application, in a step of placing the reflective component 301: the reflective component 301 comprises a reflective layer 3011 and a first control system 3012, the reflective layer 3011 is placed outside the first substrate on a path propagation of the ultraviolet light, then the reflective layer 3011 is electrically connected to the first control system 3012, and a reflection intensity of the reflective layer 3011 is controlled by the first control system 3012.

In details, through the first control system 3012, the reflection intensity can be controlled, different degrees of reflected light irradiation can be formed, and the first control system 3012 can also be controlled to form different pretilt angles.

Figure 3:
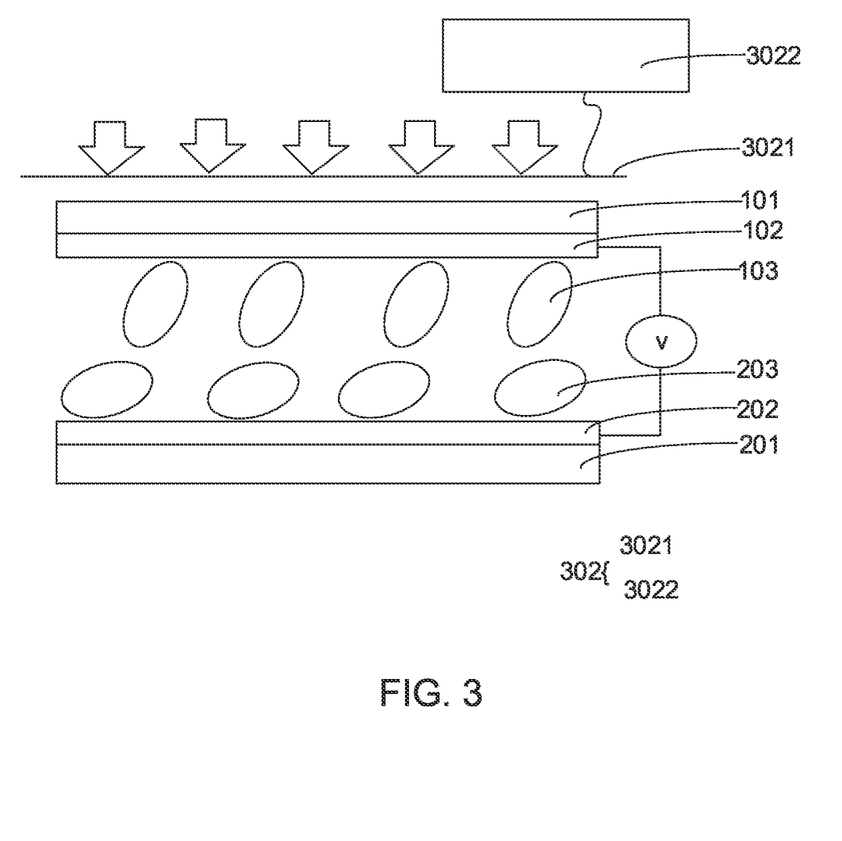
FIG. 3 is a second schematic cross-sectional view of alignment in a manufacturing method of a liquid crystal display panel provided by an embodiment of the present application.

In an embodiment of the present application, referring to FIG. 3, in a step of forming and/or placing the at least one energy compensation device: the first substrate is an array substrate, the ultraviolet light is irradiated to the first substrate from an outside of the second substrate, the energy compensation device comprises an optical component 302, the optical component 302 is placed outside the first base 101, and the optical component 302 is configured to control a propagation direction of the ultraviolet light and change the ultraviolet light in a parallel state to a divergent state.

In details, an adjusted divergent light path has a uniform energy density in a plane of the first substrate and the second substrate. In the irradiation direction of ultraviolet light, the energy density varies with a propagation distance.

In details, through the adjusted divergent light path, the difference in light intensity between the inner side of the first substrate and the inner side of the second substrate can be realized, and energy uniformity of the surface of the first substrate/second substrate can be ensured.

In details, the inner side of the first substrate and the inner side of the second substrate due to the difference in the intensity of ultraviolet light irradiation, under the same irradiation time, the liquid crystal molecules on the inner side of the first substrate and the liquid crystal molecules on the inner side of the second substrate will form different pretilt angles.

In an embodiment of the present application, in a step of placing the optical component 302: the optical component 302 comprises an optical device group 3021 and a second control system 3022, on a propagation path of the ultraviolet light, the optical device group 3021 is placed outside the first substrate, then the optical device group 3021 is electrically connected to the second control system 3022, and a light divergence angle of the optical device group 3021 is controlled by the second control system 3022.

In an embodiment of the present application, in a step of forming and/or placing the at least one energy compensation device: the second substrate is a color filter substrate, the energy compensation device comprises a metal layer 303 with negative refraction characteristics, and the metal layer 303 with negative refraction characteristics is formed by vapor deposition on an inner surface of the second base 201.

Figure 4:
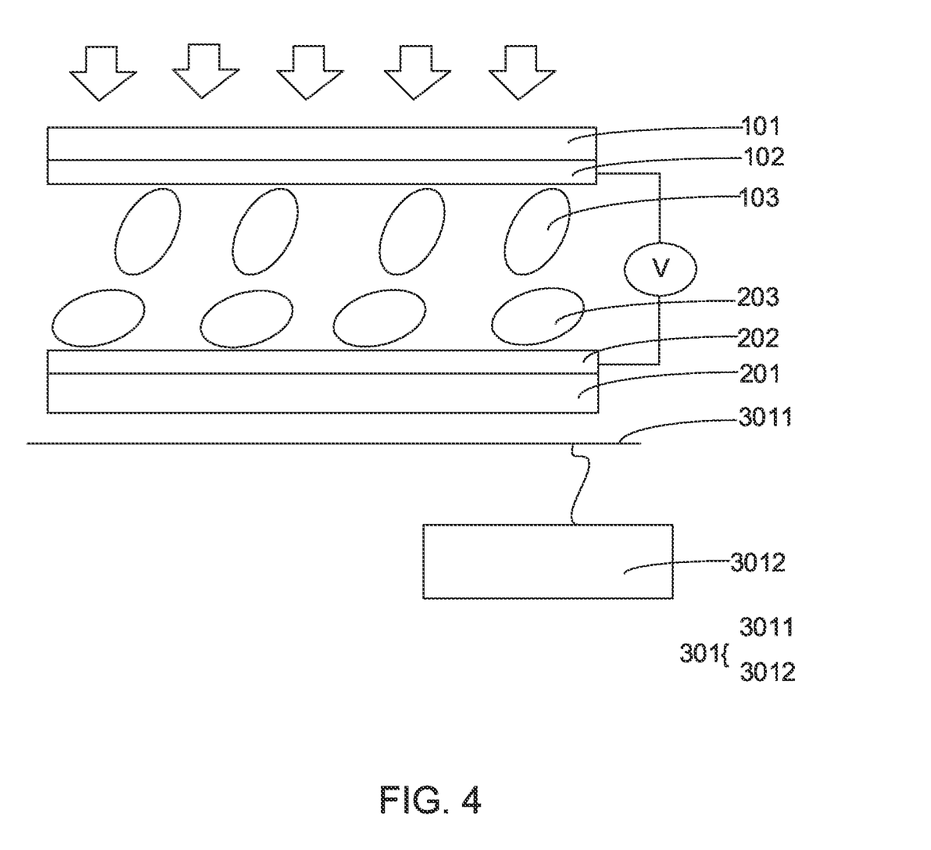
FIG. 4 is a third schematic cross-sectional view of alignment in a manufacturing method of a liquid crystal display panel provided by an embodiment of the present application.

In an embodiment of the present application, referring to FIG. 4, in a step of forming and/or placing the at least one energy compensation device: the second substrate is a color filter substrate, the ultraviolet light is irradiated to the second substrate from an outside of the first substrate, the energy compensation device comprises a reflective component 301, the reflective component 301 is placed outside the second base 201, and the reflective component 301 is configured to reflect light to an inner area of the second substrate.

In an embodiment of the present application, in a step of placing the reflective component 301: the reflective component 301 comprises a reflective layer 3011 and a first control system 3012, the reflective layer 3011 is placed outside the second base 3012 on a path propagation of the ultraviolet light, then the reflective layer 3011 is electrically connected to the first control system 3012, and a reflection intensity of the reflective layer 3011 is controlled by the first control system 3012.

Figure 5:
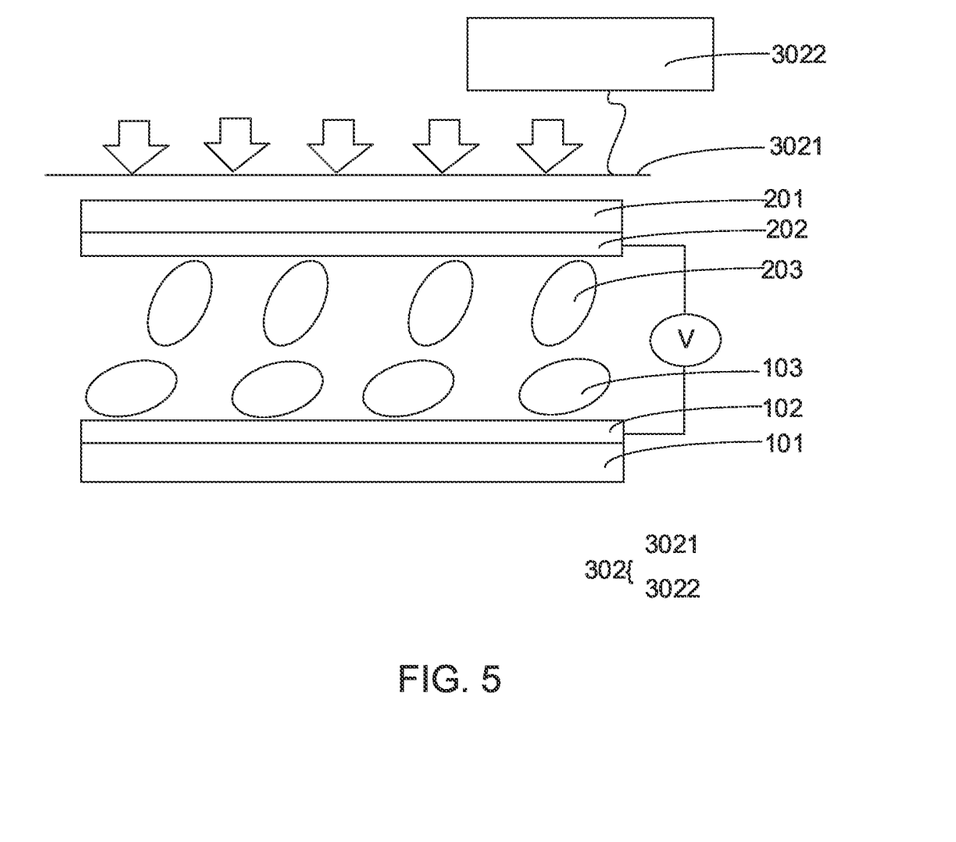
FIG. 5 is a fourth schematic cross-sectional view of alignment in a manufacturing method of a liquid crystal display panel provided by an embodiment of the present application.

In an embodiment of the present application, referring to FIG. 5, in a step of forming and/or placing the at least one energy compensation device: the second substrate is a color filter substrate, the ultraviolet light is irradiated to the second substrate from an outside of the first substrate, the energy compensation device comprises an optical component 302, the optical component 302 is placed outside the second base 201, and the optical component 302 is configured to control a propagation direction of the ultraviolet light and change the ultraviolet light in a parallel state to a divergent state.

In an embodiment of the present application, in a step of placing the optical component 302: the optical component 302 comprises an optical device group 3021 and a second control system 3022, on a propagation path of the ultraviolet light, the optical device group 3021 is placed outside the second substrate, then the optical device group 3021 is electrically connected to the second control system 3022, and a light divergence angle of the optical device group 3021 is controlled by the second control system 3022.

In an embodiment of the present application, in a step of forming and/or placing the at least one energy compensation device: the first substrate is an array substrate, the ultraviolet light is irradiated to the first substrate from an outside of the second substrate, the energy compensation device comprises a metal layer 303 with negative refraction characteristics and a reflective component 301, the metal layer 303 with negative refraction characteristics is formed on an inner surface of the first base 101, the reflective component 301 is placed outside the first base 101, the reflective component 301 comprises a reflective layer 3011 and a first control system 3012, and a reflection intensity of the reflective layer 3011 is controlled by the first control system 3012.

In an embodiment of the present application, in a step of forming and/or placing the at least one energy compensation device: the first substrate is an array substrate, the ultraviolet light is irradiated to the first substrate from an outside of the second substrate, the energy compensation device includes an optical component 302 and a reflective component 301. The optical component 302 is placed outside the second base 201. The reflective component 301 is placed outside the first base 101. The reflective component 301 includes a reflective layer 3011 and a first control system 3012. The reflection intensity of the reflective layer 3011 is controlled by the first control system 3012.

In details, the optical component 302 includes an optical device group 3021 and a second control system 3022. On a propagation path of the ultraviolet light, the optical device group 3021 is placed outside the second substrate. Then, the optical device group 3021 is electrically connected to the second control system 3022. The light divergence angle of the optical device group 3021 is controlled by the second control system 3022.

In an embodiment of the present application, in a step of forming and/or placing the at least one energy compensation device: the first substrate is an array substrate, the ultraviolet light is irradiated to the second substrate from an outside of the first substrate, the energy compensation device comprises a metal layer 303 with negative refraction characteristics and an optical component 302, the metal layer 303 with negative refraction characteristics is formed on an inner surface of the first base 101, the optical component 302 is placed outside the first base 101, the optical component 302 comprises an optical device group 3021 and a second control system 3022, and a light divergence angle of the optical device group 3021 is controlled by the second control system 3022.

In an embodiment of the present application, in a step of forming and/or placing the at least one energy compensation device: the second substrate is a color filter substrate, the ultraviolet light is irradiated to the second substrate from an outside of the first substrate, the energy compensation device comprises a metal layer 303 with negative refraction characteristics and a reflective component 301, the metal layer 303 with negative refraction characteristics is formed on an inner surface of the second base 201, the reflective component 301 is placed outside the second base 201, the reflective component 301 comprises a reflective layer 3011 and a first control system 3012, and a reflection intensity of the reflective layer 3011 is controlled by the first control system 3012.

In an embodiment of the present application, in a step of forming and/or placing the at least one energy compensation device: the second substrate is a color filter substrate, the ultraviolet light is irradiated to the second substrate from an outside of the first substrate, the energy compensation device comprises a metal layer 303 with negative refraction characteristics and an optical component 302, the metal layer 303 with negative refraction characteristics is formed on an inner surface of the second base 201, the optical component 302 is placed outside the second base 201, the optical component 302 comprises an optical device group 3021 and a second control system 3022, and a light divergence angle of the optical device group 3021 is controlled by the second control system 3022.

In an embodiment of the present application, in a step of forming and/or placing the at least one energy compensation device: the second substrate is a color filter substrate, the ultraviolet light is irradiated to the second substrate from an outside of the first substrate, the energy compensation device includes an optical component 302 and a reflective component 301. The optical component 302 is placed outside the first base 101. The reflective component 301 is placed outside the second base 201. The reflective component 301 includes a reflective layer 3011 and a first control system 3012. The reflection intensity of the reflective layer 3011 is controlled by the first control system 3012.

In details, the optical component 302 includes an optical device group 3021 and a second control system 3022. On a propagation path of the ultraviolet light, the optical device group 3021 is placed outside the first substrate. Then, the optical device group 3021 is electrically connected to the second control system 3022. The light divergence angle of the optical device group 3021 is controlled by the second adjusting system 3022.

Figure 6:
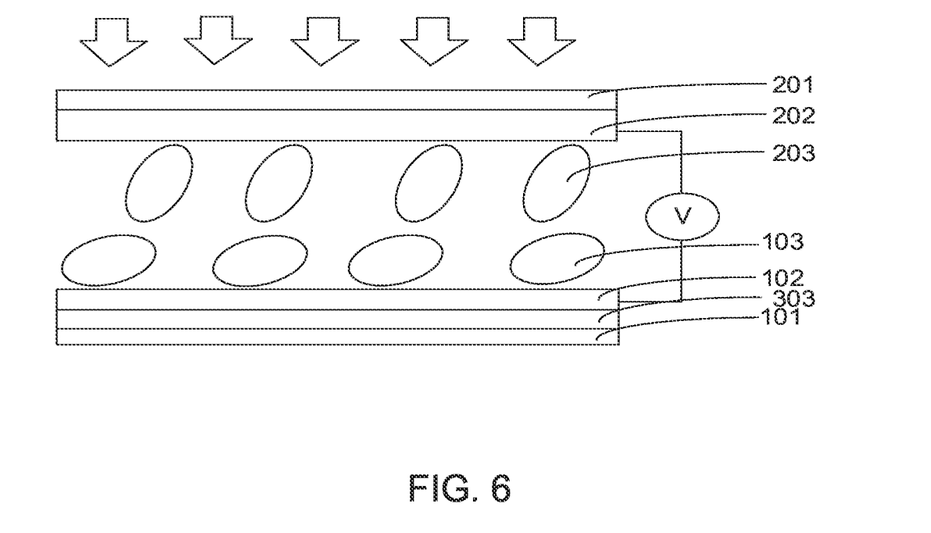
FIG. 6 is a first schematic cross-sectional view of a liquid crystal display panel provided by an embodiment of the present application.
Figure 7:
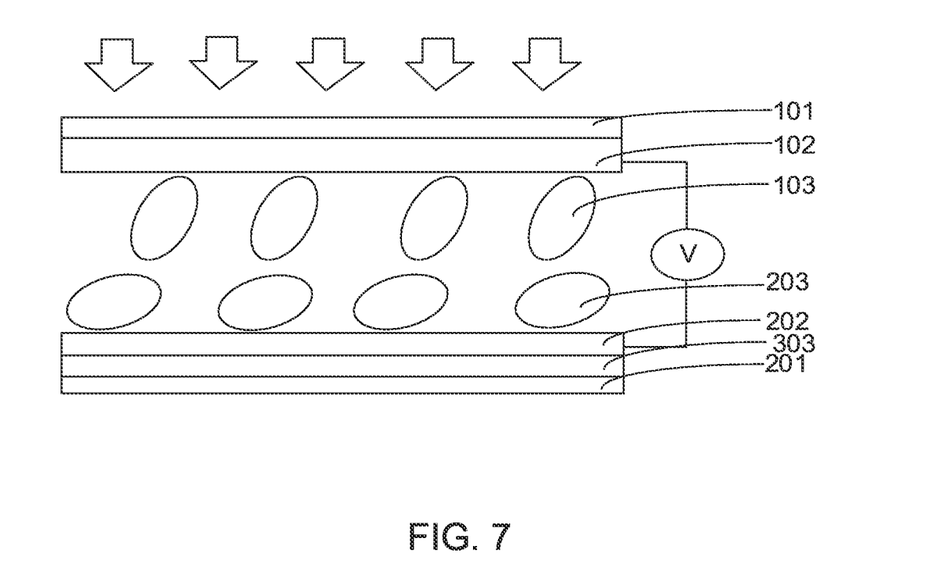
FIG. 7 is a second schematic cross-sectional view of a liquid crystal display panel provided by an embodiment of the present application.

Referring to FIG. 6 and FIG. 7, an embodiment of the present application provides a liquid crystal display panel. The liquid crystal display panel comprises a first substrate and a second substrate that are opposed to each other and arranged in a cell, and liquid crystal molecules arranged between the first substrate and the second substrate. The first substrate comprises a first base 101 and a first alignment layer 102 disposed inside the first base 101. The second substrate comprises a second base 201 and a second alignment layer 202 disposed inside the second base 201. A metal layer 303 with negative refraction characteristics is provided on an inner surface of the first base 101 or an inner surface of the second base 201, an angle difference between pretilt angles between first liquid crystal molecules 103 inside the first substrate and second liquid crystal molecules 203 inside the second substrate is greater than a preset angle.

In an embodiment of the present application, referring to FIG. 6, the metal layer 303 with negative refraction characteristics is disposed on an inner surface of the first base 101.

In details, a pretilt deflection angle of the first liquid crystal molecules 103 inside the first substrate is greater than a pretilt deflection angle of the second liquid crystal molecules 203 inside the second substrate.

In details, a pretilt deflection angle of the first liquid crystal molecules 103 inside the first substrate is less than a pretilt deflection angle of the second liquid crystal molecules 203 inside the second substrate.

In an embodiment of the present application, referring to FIG. 7, the metal layer 303 with negative refraction characteristics is disposed on an inner surface of the second base 201.

In details, a pretilt deflection angle of the first liquid crystal molecules 103 inside the first substrate is greater than a pretilt deflection angle of the second liquid crystal molecules 203 inside the second substrate.

In details, a pretilt deflection angle of the first liquid crystal molecules 103 inside the first substrate is less than a pretilt deflection angle of the second liquid crystal molecules 203 inside the second substrate.

A manufacturing method of a liquid crystal display panel provided by an embodiment of the present application includes vertical irradiation of a first substrate and a second substrate with ultraviolet light for alignment. An energy compensation device is formed and/or placed in an irradiation direction of the ultraviolet light. An angle difference in pretilt angles between first liquid crystal molecules inside the first substrate and second liquid crystal molecules inside the second substrate is greater than a preset angle. An energy intensity inside the first substrate or inside the second substrate is controlled by the energy compensation device, so that the angle difference in the pretilt angles between the first liquid crystal molecules inside the first substrate and the second liquid crystal molecules inside the second substrate is large. This alleviates a technical problem that a current liquid crystal display panel has a small angle difference in pretilt angles between an inner side of a first substrate and an inner side of a second substrate.

The one provided in the embodiment of the present application is described in detail above. Specific examples are used in this article to illustrate the principle and implementation of the present application. The description of the above embodiments is only used to help understand the technical solutions and core ideas of the present application. Those of ordinary skill in the art should understand that they can still modify the technical solutions recorded in the foregoing embodiments, or equivalently replace some of the technical features. However, these modifications or replacements do not cause the essence of the corresponding technical solutions to deviate from the scope of the technical solutions of the embodiments of the present application.

What is claimed is:

1. A manufacturing method of a liquid crystal display panel, comprising:
providing a first base and a second base;
forming a first alignment layer on the first base to form a first substrate;
forming a second alignment layer on the second base to form a second substrate;
arranging the first substrate and the second substrate in a cell to form a liquid crystal cell, and injecting liquid crystal molecules into the liquid crystal cell;
irradiating the first substrate and/or the second substrate vertically with ultraviolet light; and
forming and/or placing at least one energy compensation device in an irradiation direction of the ultraviolet light to make an angle difference between pretilt angles between first liquid crystal molecules inside the first substrate and second liquid crystal molecules inside the second substrate is greater than a preset angle;
wherein in a step of forming and/or placing the at least one energy compensation device:
the first substrate is an array substrate, the energy compensation device comprises a metal layer with negative refraction characteristics, and the metal layer with negative refraction characteristics is formed by vapor deposition on an inner surface of the first base.

2. The manufacturing method of the liquid crystal display panel according to claim 1, wherein in a step of forming and/or placing the at least one energy compensation device:
the second substrate is a color filter substrate, the energy compensation device comprises a metal layer with negative refraction characteristics, and the metal layer with negative refraction characteristics is formed by vapor deposition on an inner surface of the second base.

3. The manufacturing method of the liquid crystal display panel according to claim 1, wherein in a step of forming and/or placing the at least one energy compensation device:
the second substrate is a color filter substrate, the ultraviolet light is irradiated to the second substrate from an outside of the first substrate, the energy compensation device comprises a reflective component, the reflective component is placed outside the second base, and the reflective component is configured to reflect light to an inner area of the second substrate.

4. The manufacturing method of the liquid crystal display panel according to claim 3, wherein in a step of placing the reflective component:
the reflective component comprises a reflective layer and a first control system, the reflective layer is placed outside the second base on a path propagation of the ultraviolet light, the reflective layer is electrically connected to the first control system, and a reflection intensity of the reflective layer is controlled by the first control system.

5. The manufacturing method of the liquid crystal display panel according to claim 1, wherein in a step of forming and/or placing the at least one energy compensation device:
the second substrate is a color filter substrate, the ultraviolet light is irradiated to the second substrate from an outside of the first substrate, the energy compensation device comprises an optical component, the optical component is placed outside the second base, and the optical component is configured to control a propagation direction of the ultraviolet light and change the ultraviolet light in a parallel state to a divergent state.

6. The manufacturing method of the liquid crystal display panel according to claim 5, wherein in a step of placing the optical component:
the optical component comprises an optical device group and a second control system, on a propagation path of the ultraviolet light, the optical device group is placed outside the second substrate, the optical device group is electrically connected to the second control system, and a light divergence angle of the optical device group is controlled by the second control system.

7. The manufacturing method of the liquid crystal display panel according to claim 1, wherein in a step of forming and/or placing the at least one energy compensation device:
the first substrate is an array substrate, the ultraviolet light is irradiated to the first substrate from an outside of the second substrate, the energy compensation device comprises a metal layer with negative refraction characteristics and a reflective component, the metal layer with negative refraction characteristics is formed on an inner surface of the first base, the reflective component is placed outside the first base, the reflective component comprises a reflective layer and a first control system, and a reflection intensity of the reflective layer is controlled by the first control system.

8. The manufacturing method of the liquid crystal display panel according to claim 1, wherein in a step of forming and/or placing the at least one energy compensation device:
the first substrate is an array substrate, the ultraviolet light is irradiated to the second substrate from an outside of the first substrate, the energy compensation device comprises a metal layer with negative refraction characteristics and an optical component, the metal layer with negative refraction characteristics is formed on an inner surface of the first base, the optical component is placed outside the first base, the optical component comprises an optical device group and a second control system, and a light divergence angle of the optical device group is controlled by the second control system.

9. The manufacturing method of the liquid crystal display panel according to claim 1, wherein in a step of forming and/or placing the at least one energy compensation device:
the second substrate is a color filter substrate, the ultraviolet light is irradiated to the second substrate from an outside of the first substrate, the energy compensation device comprises a metal layer with negative refraction characteristics and a reflective component, the metal layer with negative refraction characteristics is formed on an inner surface of the second base, the reflective component is placed outside the second base, the reflective component comprises a reflective layer and a first control system, and a reflection intensity of the reflective layer is controlled by the first control system.

10. The manufacturing method of the liquid crystal display panel according to claim 1, wherein in a step of forming and/or placing the at least one energy compensation device:
the second substrate is a color filter substrate, the ultraviolet light is irradiated to the second substrate from an outside of the first substrate, the energy compensation device comprises a metal layer with negative refraction characteristics and an optical component, the metal layer with negative refraction characteristics is formed on an inner surface of the second base, the optical component is placed outside the second base, the optical component comprises an optical device group and a second control system, and a light divergence angle of the optical device group is controlled by the second control system.

11. A manufacturing method of a liquid crystal display panel, comprising:
providing a first base and a second base;
forming a first alignment layer on the first base to form a first substrate;
forming a second alignment layer on the second base to form a second substrate;
arranging the first substrate and the second substrate in a cell to form a liquid crystal cell, and injecting liquid crystal molecules into the liquid crystal cell;
irradiating the first substrate and/or the second substrate vertically with ultraviolet light; and
forming and/or placing at least one energy compensation device in an irradiation direction of the ultraviolet light to make an angle difference between pretilt angles between first liquid crystal molecules inside the first substrate and second liquid crystal molecules inside the second substrate is greater than a preset angle;
wherein in a step of forming and/or placing the at least one energy compensation device:
the first substrate is an array substrate, the ultraviolet light is irradiated to the first substrate from an outside of the second substrate, the energy compensation device comprises a reflective component, the reflective component is placed outside the first base, and the reflective component is configured to reflect light to an inner area of the first substrate.

12. The manufacturing method of the liquid crystal display panel according to claim 11, wherein in a step of placing the reflective component:
the reflective component comprises a reflective layer and a first control system, the reflective layer is placed outside the first substrate on a path propagation of the ultraviolet light, the reflective layer is electrically connected to the first control system, and a reflection intensity of the reflective layer is controlled by the first control system.

13. A manufacturing method of a liquid crystal display panel, comprising:
providing a first base and a second base;
forming a first alignment layer on the first base to form a first substrate;
forming a second alignment layer on the second base to form a second substrate;
arranging the first substrate and the second substrate in a cell to form a liquid crystal cell, and injecting liquid crystal molecules into the liquid crystal cell;
irradiating the first substrate and/or the second substrate vertically with ultraviolet light; and
forming and/or placing at least one energy compensation device in an irradiation direction of the ultraviolet light to make an angle difference between pretilt angles between first liquid crystal molecules inside the first substrate and second liquid crystal molecules inside the second substrate is greater than a preset angle;
wherein in a step of forming and/or placing the at least one energy compensation device:
the first substrate is an array substrate, the ultraviolet light is irradiated to the first substrate from an outside of the second substrate, the energy compensation device comprises an optical component, the optical component is placed outside the first base, and the optical component is configured to control a propagation direction of the ultraviolet light and change the ultraviolet light in a parallel state to a divergent state.

14. The manufacturing method of the liquid crystal display panel according to claim 5, wherein in a step of placing the optical component:
the optical component comprises an optical device group and a second control system, on a propagation path of the ultraviolet light, the optical device group is placed outside the first substrate, the optical device group is electrically connected to the second control system, and a light divergence angle of the optical device group is controlled by the second control system.

* * * * *

UNITED STATES PATENT AND TRADEMARK OFFICE
CERTIFICATE OF CORRECTION

| | |
|---|---|
| PATENT NO. | : 11,513,397 B2 |
| APPLICATION NO. | : 17/055620 |
| DATED | : November 29, 2022 |
| INVENTOR(S) | : Min Huang et al. |

It is certified that error appears in the above-identified patent and that said Letters Patent is hereby corrected as shown below:

On the Title Page

In item (73) Assignee:
"Shenzhen China Stor Optoelectronics Semiconductor Display Technology Co., Ltd."
Should be changed to:
-- Shenzhen China Star Optoelectronics Semiconductor Display Technology Co., Ltd. --

Signed and Sealed this
Ninth Day of May, 2023

Katherine Kelly Vidal
*Director of the United States Patent and Trademark Office*